United States Patent
Klein Middelink et al.

(10) Patent No.: US 9,560,349 B2
(45) Date of Patent: Jan. 31, 2017

(54) EMBEDDED DATA SIGNALING

(71) Applicant: Koninklijke Philips Electronics N.V., Eindhoven (NL)

(72) Inventors: Marc W. T. Klein Middelink, Eindhoven (NL); Jan Van Der Meer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 831 days.

(21) Appl. No.: 13/763,755

(22) Filed: Feb. 11, 2013

(65) Prior Publication Data
US 2013/0148716 A1 Jun. 13, 2013

Related U.S. Application Data

(62) Division of application No. 10/531,929, filed on Apr. 19, 2005, now Pat. No. 8,391,371.

(51) Int. Cl.
*H04N 7/18* (2006.01)
*H04N 19/46* (2014.01)
*H04N 7/52* (2011.01)

(52) U.S. Cl.
CPC .......... *H04N 19/00545* (2013.01); *H04N 7/52* (2013.01); *H04N 19/46* (2014.11)

(58) Field of Classification Search
CPC ..................................................... H04N 19/00
USPC .............................. 375/240.25–26
See application file for complete search history.

(56) References Cited

U.S. PATENT DOCUMENTS

| | | | |
|---|---|---|---|
| 5,592,398 A | 1/1997 | Terauchi et al. | 370/535 |
| 5,619,384 A | 4/1997 | Leonhardt et al. | |
| 6,134,200 A | 10/2000 | Timmermans | |
| 6,529,604 B1 | 3/2003 | Park et al. | |
| 6,708,145 B1 | 3/2004 | Liljeryd et al. | 704/200.1 |
| 6,907,070 B2 | 6/2005 | Wu et al. | 375/240.12 |
| 7,039,116 B1 | 5/2006 | Zhang et al. | 375/240.26 |
| 7,340,762 B2 | 3/2008 | Kim | 725/58 |
| 2002/0035544 A1 | 3/2002 | Wakao et al. | |
| 2002/0092032 A1 | 7/2002 | Kim | |

FOREIGN PATENT DOCUMENTS

| | | |
|---|---|---|
| EP | 0993200 A2 | 4/2000 |
| EP | 0993200 A3 | 11/2001 |
| EP | 1154650 A2 | 11/2001 |
| EP | 1213912 A2 | 6/2002 |
| JP | 09219649 A | 8/1997 |
| JP | 11317672 A | 11/1999 |
| JP | 2000068970 A | 3/2000 |
| JP | 2000339852 | 12/2000 |

(Continued)

OTHER PUBLICATIONS

Faller et al: "Binaural Cue Coding Applied to Stereo and Multi-Channel Audio Compression"; AES Convention Paper, 112th Convention, May 2002, Munich, Germany, 9 Page Document.

(Continued)

*Primary Examiner* — Andy Rao

(57) ABSTRACT

The invention provides main data (MD) which includes embedded data (ED), the data being provided with a main data descriptor (MDD) for signaling a content included in the main data, wherein an embedded data descriptor (EDD) is formed for signaling content included in the embedded data and wherein the embedded data descriptor is provided outside the main data and the main data descriptor.

16 Claims, 1 Drawing Sheet

(56) References Cited

FOREIGN PATENT DOCUMENTS

| | | |
|---|---|---|
| JP | 2002082610 A | 3/2002 |
| RU | 2073913 C1 | 2/1997 |
| WO | WO 01/74085 A2 | 10/2001 |

OTHER PUBLICATIONS

Kikuchi et al: IETF RFC 3016: "RTP Payload Format for MPEG-4 Audio/Visual Streams", Nov. 2000, 21 Page Document.

EMBEDDED DATA SIGNALING

CROSS REFERENCE TO RELATED APPLICATION

This application is a divisional application and claims the benefit of U.S. patent application Ser. No. 10/531,929, filed Apr. 19, 2005, and International Application Number PCT/IB2003/004620, filed Oct. 20, 2003 and having Oct. 22, 2002 as the claimed priority date, which is incorporated herein in whole by reference.

The invention relates to signaling of embedded data, and also to the formatting and handling of data streams with embedded data.

The syntax definition of several audio coding schemes/standards (e.g. mp3 and MPEG-AAC, see e.g. ISO/IEC 13818-3 and 13818-7 respectively) provides the possibility of adding ancillary/embedded data to coded audio streams. Compliant decoders are only required to parse the embedded data, not to interpret it. In practice, the embedded data is often used to store a coded data stream related to an enhancement coder/tool (e.g. mp3PRO, MPEG-4 AAC+SBR, wherein "SBR" stands for Spectral Band Replication). Such an enhanced coder/tool can be used on top of the core coder to improve the quality of the core audio stream. Since a non-enhanced coder is required to parse the embedded data, the data embedding is done in backward compatible manner.

In MPEG-4 (see ISO/IEC 14496-1 for MPEG-4 Systems and ISO/IEC 14496-3 for MPEG-4 Audio), signaling of stream content is done by means of descriptors. Each elementary stream (i.e. a consecutive flow of mono-media data such as audio or video which can be packetized) has a corresponding descriptor. The current descriptor definition does not provide for signaling of embedded data. Signaling of the embedded data can of course be realized by means of a corrigendum on the descriptors. However, such a corrigendum cannot be implemented such that the standard remains backward compatible with the current definition. Alternatively, one could use a descriptor in the embedded data itself This has the disadvantage that the embedded data is not signaled at elementary stream level and that therefore the embedded data needs to be accessed to see what it contains.

An object of the invention is to provide advantageous signaling of embedded data. To this end, the invention provides a method, an encoder, a signal, a storage medium, a method of decoding, a decoder, a transmitter or recorder and a receiver as defined in the independent claims. Advantageous embodiments are defined in the dependent claims.

According to a first aspect of the invention, a signal representing main data is provided, the main data including embedded data, the main data being provided with a main data descriptor for signaling content included in the main data, wherein an embedded data descriptor is formed for signaling content included in the embedded data, and wherein the embedded data descriptor is provided outside (or separate from) the main data and the main data descriptor. By providing the embedded data descriptor outside the main data descriptor, a corrigendum of a currently defined set of main data descriptors is not necessary to take into account non-defined content included in the embedded data; a signal having new embedded data descriptors remains backward compatible as regards the main data and the main data descriptors. By providing the embedded data descriptor outside the main data and thus also outside the embedded data, the main data remains compatible and it is further not necessary to access the embedded data itself to get a description of it.

As a result, elementary streams with embedded data may have two respective descriptors, one for the main data and another for the embedded data.

The main data, the embedded data, the main data descriptor and the embedded data descriptor may all be present in the same transport signal.

Advantageously, the signal is an elementary audio data stream, wherein the embedded data is enhancement data to enhance the audio available in the rest of the elementary data stream. The enhancement data is preferably information suitable for performing spectral band replication. Alternatively, the enhancement data is suitable for extension of the number of channels, e.g. from 1 to 2 channels or from 2 to 5 channels, see e.g. the paper of Faller and Baumgarte, "Binaural cue coding applied to stereo and multi-channel audio compression", AES $112^{th}$ paper 5574, May 10-13, 2002, Germany and e.g. European patent application nr. 02076588.9 filed 22 Apr. 2002.

Embodiments of the invention are especially useful in those standards in which it is possible to implement a separate embedded data descriptor such that a conventional coder will not wrongfully use its contents, e.g. by ignoring the embedded data descriptor e.g. simply because it uses a non-recognizable code which orders a decoder to ignore the information. Examples of standards where this is easily possible are MPEG-4 systems and RFC 3016.

These and other aspects of the invention will be apparent from the elucidated with reference to the accompanying drawings.

The drawings only show those elements that are necessary to understand the embodiments of the invention.

Figure 1:
FIG. 1 shows an example of a conventional elementary stream.

FIG. 1 shows an example of a conventional elementary stream ES. The elementary stream ES may be a packetized elementary stream. The elementary stream ES comprises main data MD and a main data descriptor MDD. An exemplary descriptor MDD for an encoded audio stream may be as follows:

---

MDD
{
    Audio object type ("AOT")
    Sampling frequency
    Channel configuration
    AOT specific configuration information
}

---

As an example, configuration information specific to AAC related AOT's include a frame length, i.e. the number of PCM samples per channel related to one AAC audio frame.

Further, the main data MD includes embedded data ED. The main data MD preferably comprises encoded audio data, e.g. AAC or mp3 encoded data. It is also possible that the main data MD comprises video data. The embedded data ED preferably includes enhancement data to enhance the main data MD, e.g. by spectral band replication in the case of audio or by spatial, SNR or other enhancement for video. Alternatively, the enhancement data is suitable for extension of the number of channels, e.g. from 1 to 2 channels or from 2 to 5 channels as indicated above.

In some systems, e.g. in MPEG-4, the data descriptor MDD is not concatenated with the main data MD in the elementary stream, but is provided separately. To determine which descriptor relates to which elementary stream, some identification is used in both the descriptor as well as the elementary stream ES.

The embedded data ED is parsed in a decoder and recognized by an enhanced decoder which is able to use the enhancement data present in ED. Usually, the embedded data ED includes some kind of identification/description to make identification of the enhancement data ED possible, although in proprietary systems it is also possible to agree between an encoder and a decoder that the embedded data ED always comprises enhancement data according to a predetermined format.

Figure 2:
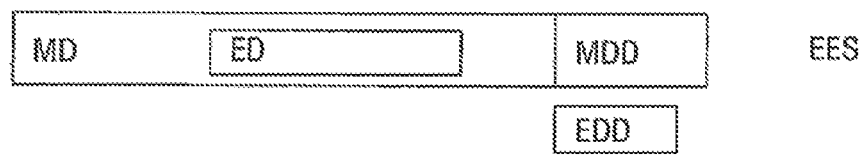
FIG. 2 shows an example of an elementary stream provided with an embedded data descriptor according to an embodiment of the invention.

FIG. 2 shows an example of a further elementary stream EES provided with an embedded data descriptor EDD according to an embodiment of the invention. The embedded data descriptor EDD includes identification information to make identification of the type of embedded data ED possible. The descriptor EDD may also include other useful information. An exemplary descriptor EDD for the data embedded in an encoded audio stream may be as follows:

```
EDD
{
    Audio (enhancement) object type ("AOT")
    AOT specific configuration information
}
```

The definition of the EDD strongly depends on the audio (enhancement) object type. In the case of SBR, it contains the sampling frequency mode, which can be single- or multi-rate. In the case of channel extension, the embedded data descriptor may contain information on the extended channel configuration.

The embedded data descriptor EDD is provided outside the main data MD and the main data descriptor MDD and is therefore easily accessible. Depending on the coding scheme used the data descriptors MDD and EDD may be supplied in a concatenated way with the main data MD. It is also possible to provide the descriptors separately in another part of the signal, e.g. all descriptors grouped together. Some linking information is then necessary to relate the descriptors to the relevant elementary streams.

MPEG-4 Implementation

The above described embodiment of the invention is advantageously applied in an MPEG-4 or MPEG-4 like coding scheme. In MPEG-4, the main data descriptor MDD and the embedded data descriptor EDD are provided separately with respect to the elementary stream EES. MPEG-4 systems provides tools to relate the descriptors to the relevant elementary streams.

RFC3016 Implementation

In RFC 3016 (IETF RFC 3016: "RTP Payload Format for MPEG-4 Audio/Visual Streams", Kikuchi Y. et al., November 2000), descriptor information is provided as a Session Description Protocol (SDP) parameter. For example in case of audio the audio decoding configuration is described by the parameter "config" as a hexadecimal string that represents the audio descriptor as defined by MPEG-4. An example is given below:
config=000001B001000001B509000001000000120008-440FA282C2090A21F. Another descriptor can be added by defining a new parameter, such as embedded-data-config. Receivers are required to ignore new or unknown parameters.

System According to an Embodiment of the Invention

Figure 3:
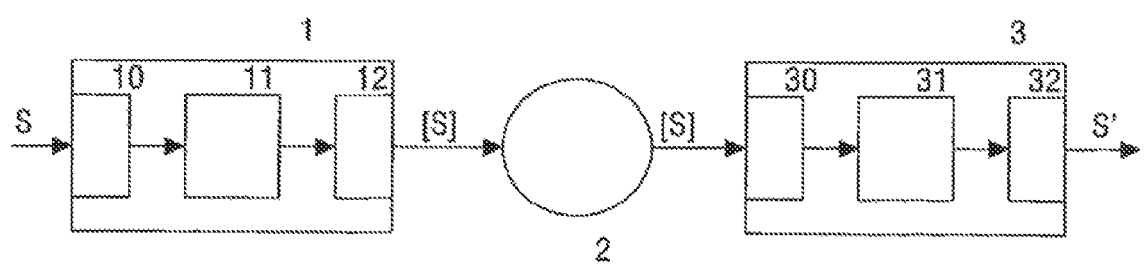
FIG. 3 shows a system according to an embodiment of the invention.

FIG. 3 shows a system according to an embodiment of the invention. The system comprises an apparatus 1 for transmitting or recording an encoded signal [S]. The apparatus 1 comprises an input unit 10 for obtaining an input signal S, e.g. an audio and/or video signal. The input unit 10 may be an antenna, microphone, network connection, etc. The apparatus 1 further comprises an encoder 11 for encoding the signal S according to an above described embodiment of the invention (see in particular FIG. 2) in order to obtain an encoded signal comprising main data MD including embedded data ED, and the descriptors MDD and EDD. The encoded signal is furnished to an output unit 12 which formats the main data MD including the embedded data ED, and the descriptors MDD and EDD into an encoded signal [S] having a suitable format for transmission or storage via a transmission medium or storage medium 2 (e.g. as defined in RFC 3016). The system further comprises a receiver or reproduction apparatus 3 which receives the encoded signal [S] in an input unit 30. The input unit 30 furnishes the main data MD, the embedded data ED and the data descriptors MDD and EDD to the decoder 31. The decoder 31 decodes the encoded signal by performing a decoding process which is substantially an inverse operation of the encoding in the encoder 11 wherein a decoded signal S' is obtained which corresponds to the original signal S except for those parts which were lost during the encoding process. The decoder 31 furnishes the decoded signal S' to a reproduction unit 32 such as a speaker for reproducing the decoded signal S'. The reproduction unit 32 may also be a transmitter for further transmitting the decoded signal S' for example over an in-home network, etc.

Existing receivers are able to ignore the EDD as described above for the RFC 3016 case. Future receiver implementations may be able to interpret the EDD. In this case passing of the EDD to unit 31 may be dependent on the capabilities of unit 31. For example, in those implementations wherein the decoder 31 does not support a feature to which the embedded data relates, then the input unit 30 may decide not to provide the EDD to unit 31 in order to save bandwidth.

Embodiments of the invention may be applied in audio and/or video broadcast, Internet Radio, 3GPP, Internet distribution, Solid State Audio, 3G terminals, GPRS and commercial successors thereof.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. This word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of providing a data stream representing main video data (MD), the main video data including embedded video data (ED) wherein the embedded video data content comprises enhancement data configured to enhance the main video data, and a main data descriptor (MDD) signaling content included in the main video data, the method comprising:
   receiving main video data including embedded video data, and a main data descriptor signaling content included in the main video data;
   forming an embedded data descriptor (EDD), by an apparatus configured to identify content included in the embedded video data; and
   providing an embedded data descriptor in a data stream separately from the main video data and the main data descriptor, wherein the embedded data descriptor is identified by a code supporting decoding of the EDD by selected decoding systems.

2. The method as claimed in claim 1, wherein the main video data further comprises audio and wherein the embedded video data comprises data to enhance the audio data.

3. An encoder generating a data stream representing main video data (MD), the main video data including embedded video data (ED), the main video data being provided with a main data descriptor (MDD) identifying content included in the main video data, the encoder configure to:
   receive main video data including: embedded video data, and a main data descriptor signaling content included in the main video data;
      form an embedded data descriptor (EDD) identifying content included in the embedded video data, wherein the embedded video data content comprises enhancement data configured to enhance the main video data during reproduction of the main video data; and
      provide the embedded data descriptor in data stream separately from the main video data and the main data descriptor, wherein the embedded data descriptor is identified by a code supporting decoding of the EDD by selected decoding systems.

4. A storage medium having stored thereon a data stream accessible by a reproduction device configured to reproduce the data stream, wherein the data stream comprises:
   main video data (MD) including embedded video data (ED), wherein the embedded video data provides enhancement information associated with the main video data, the main video data comprising a main data descriptor (MDD) identifying content included in the main video data, and the embedded video data comprising an embedded data descriptor (EDD) identifying content included in the embedded video data, wherein the embedded data descriptor is identified by a code supporting decoding of the EDD by selected decoding systems and is provided separately from the main video data and the main data descriptor.

5. A method of decoding a data stream comprising main video data (MD) including embedded video data (ED), the main video data comprising a main data descriptor (MDD) identifying content included in the main video data, the embedded video data comprising an embedded data descriptor (EDD) identifying content included in the embedded video data, wherein the embedded data descriptor is provided separately from (i) the main video data and (ii) the main data descriptor, the decoding method comprising the acts of:
   receiving main video data including embedded video data, and a main data descriptor signaling content included in the main video data;
   reading, via a decoding apparatus, the embedded data descriptor;
   extracting, via a decoding apparatus, a code associated with the embedded data descriptor;
   determining, via a decoding apparatus, whether the extracted code is recognizable; and
   applying, via the decoding apparatus, the embedded video data to the main video data in dependence on the recognition of the embedded data descriptor code.

6. A decoder for decoding a data stream representing main video data (MD), embedded video data (ED), a main data descriptor (MDD) identifying content included in the main video data, and an embedded data descriptor (EDD) identifying content included in the embedded video data, wherein the embedded data descriptor is provided separately from the main video data and the main data descriptor, the decoder configured to:
   receive main video data including: embedded video data, a main data descriptor signaling content included in the main video data, and an embedded data descriptor identifying content included in the embedded video data, the embedded data descriptor provided separately from the main video data and from the main data descriptor;
   read the embedded data descriptor;
   extract a code in the embedded data descriptor; and
   apply the embedded video data to enhance the main video data in dependence on the reading of the code of embedded data descriptor when the code is recognizable by the decoder.

7. An apparatus comprising:
   an input unit configured to receive an input signal comprising main video data (MD);
   an encoder configured to:
      receive the main video data (MD), the main video data including embedded video data (ED), and a main data descriptor (MDD) identifying content included in the main video data
      form an embedded data descriptor identifying content included in the embedded video data, wherein the embedded data content comprises enhancement data configured to enhance the main video data during reproduction of the main video data, the embedded data identified by a code selected to be recognizable by selected decoding systems; and
      an output unit configured to
      format into an encoded data stream, the main video data including the embedded video data, the main data descriptor, and the embedded data descriptor, wherein the embedded data descriptor is separate from the main video data and the main data descriptor; and
   perform one of: transmitting and recording the encoded data stream.

8. A receiver comprising:
   an input unit configured to:
      receive a data stream representing main video data (MD), the main video data including embedded video data (ED), a main data descriptor (MDD) identifying content included in the main video data, and an embedded data descriptor (EDD) identifying content included in the embedded video data, wherein the embedded data descriptor is provided separately from the main data and the main data descriptor wherein the embedded data content comprises enhancement data configured to enhance the main video data during reproduction of the main video data;

a decoder configured to decode the data stream to obtain a decoded signal, wherein the decode comprises:
reading the embedded data descriptor,
extracting a code from the embedded data descriptor;
determining whether the extracted code is recognizable; and
applying the embedded video data to the main video data in dependence on the code of the embedded data descriptor being recognizable; and an output unit for reproducing the decoded signal.

9. The method of claim 1, wherein the main video data includes audio data, wherein the enhancement data comprises information suitable for performing spectral band replication of the audio data of the main video data available in the data stream.

10. The method of claim 1, wherein the main video data includes audio data, wherein the enhancement data comprises information suitable for extension of a number of channels of the audio data of the main video data available in the data stream.

11. The encoder of claim 3, wherein the main video data includes audio data, wherein the enhancement data comprises information suitable for performing spectral band replication of the audio data of the main video data available in the data stream.

12. The encoder of claim 3, wherein the main video data includes audio data, and wherein the enhancement data comprises information suitable for extension of a number of channels of the audio data of the main video data available in the data stream.

13. The method of claim 5, wherein the main video data includes audio data, wherein the enhancement data comprises information suitable for performing spectral band replication of the audio data of the main video data available in the data stream.

14. The method of claim 5, wherein the main video data includes audio data, wherein the enhancement data comprises information suitable for extension of a number of channels of the audio data of the main video data available in the data stream.

15. The decoder of claim 6, wherein the main video data includes audio data, wherein the enhancement data comprises information suitable for performing spectral band replication of the audio data of the main video data available in the data stream.

16. The decoder of claim 6, wherein the main video data includes audio data wherein the enhancement data comprises information suitable for extension of a number of channels of the audio data of the main video data available in the data stream.

* * * * *